Sept. 21, 1926.
A. W. KLASSEN
SUN AND LIGHT VISOR
Filed Oct. 20, 1923
1,600,594
2 Sheets-Sheet 1
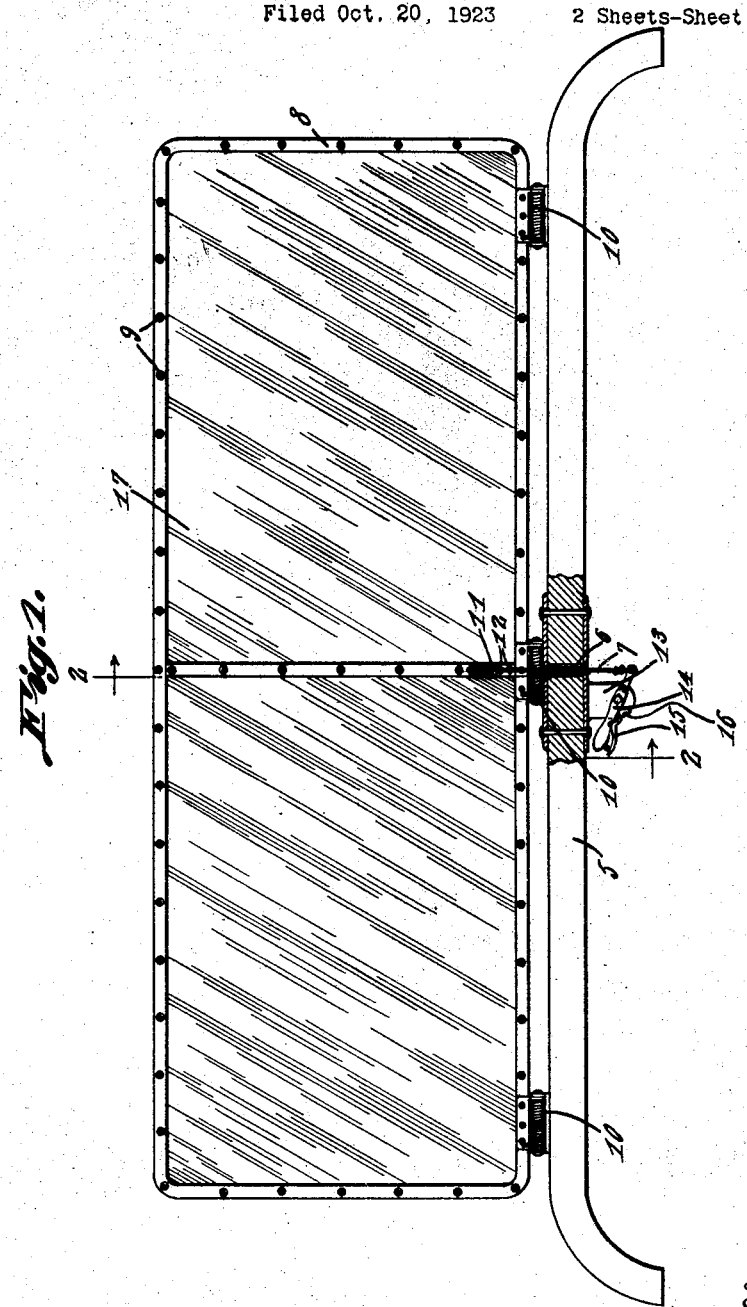
Inventor
A. W. Klassen,

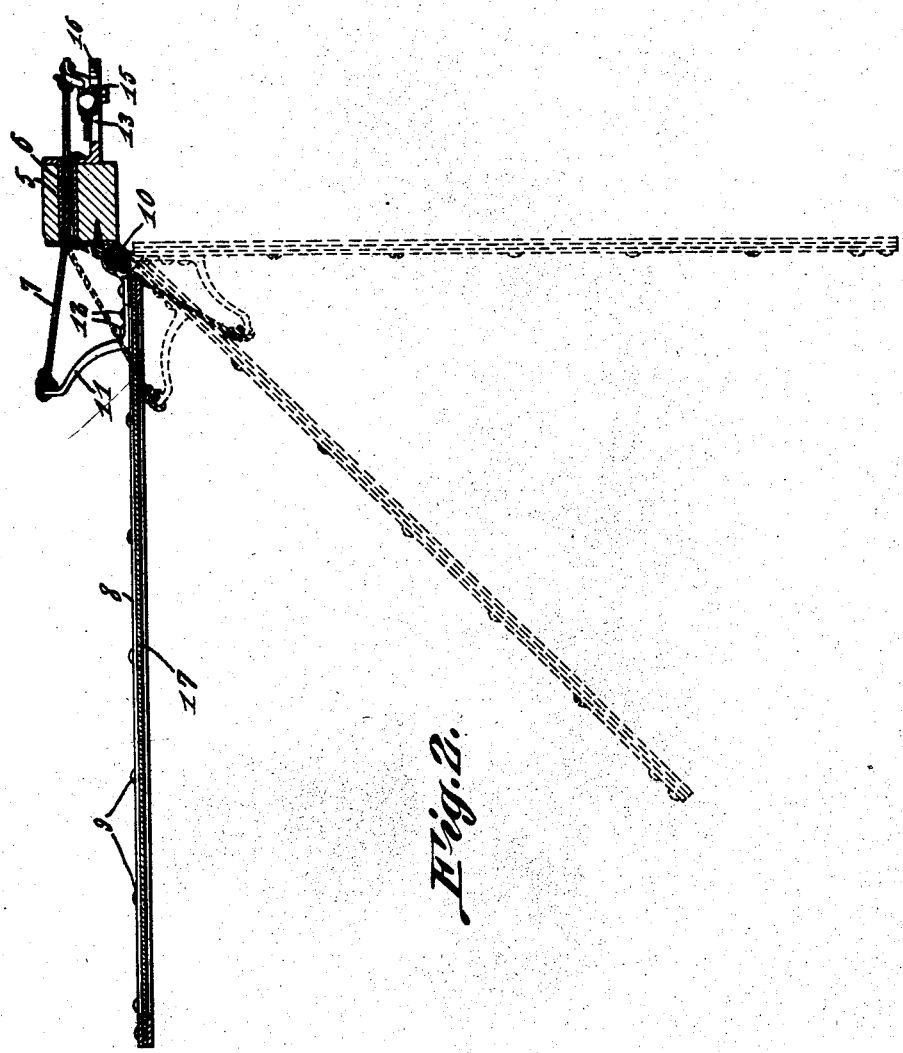

Patented Sept. 21, 1926.

1,600,594

UNITED STATES PATENT OFFICE.

ARTHUR W. KLASSEN, OF CEDAR RAPIDS, IOWA.

SUN AND LIGHT VISOR.

Application filed October 20, 1923. Serial No. 669,835.

This invention relates to a device especially designed for protecting the eyes of an operator of a vehicle from light rays which ordinarily tend to blind the driver.

An important object of the invention is to provide a device of this character which may be readily and easily moved to its active or inactive position at the will of the operator.

Another object of the invention is to provide a device of this character which may be adjusted to various positions to facilitate driving.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:—

Figure 1 is a plan view disclosing the forward bow of a motor vehicle top as supplied with a device constructed in accordance with the invention.

Figure 2 is a sectional view taken on line 2—2 of Figure 1.

Referring to the drawings in detail, the reference character 5 designates the forward bow forming a part of the top support of a motor vehicle, which bow is formed with an opening 6 through which the flexible cable 7 operates.

The deflector embodies preferably a metallic frame indicated at 8 which includes sections secured together by means of screws 9 that pass through suitable openings in the sections 8.

Spring controlled hinge members 10 are secured to the frame of the deflector and provide means for securing the deflector to the forward bow 5, so that the spring members of the hinges will tend to normally urge the deflector downwardly to intersect the line of vision of the operator of a motor vehicle equipped with the device.

Forming a part of the deflector is an outstanding arm 11 secured intermediate the ends of the frame of the deflector as by means of rivets 12, there being provided an opening in one end of the arm to receive the flexible member 7 as clearly shown by Figure 2 of the drawings.

The reference character 13 indicates a bracket member which is secured to the inner surface of the bow 5, where the same supports the controlling handle 14 which is provided with a pivoted dog 15 adapted to operate in the notches 16 formed in the outer end of the bracket so that movement of the arm 14 may be restricted and the deflector held in various positions of adjustment.

It might be further stated that the operating handle 14 will be placed on the bow 5 in such a position as to be conveniently reached and operated by the operator of a motor vehicle.

The frame supports a translucent member 17 which may be formed of suitable colored celluloid or the like material, which will tend to dissipate the light rays of approaching motor vehicles or the sunlight.

I claim:—

A shield embodying a frame, a member formed of translucent material supported by the frame, means for securing the frame to the forward bow of a top, said bow having an opening formed therein, an outwardly extended arm carried by the frame, a bracket member secured to the inner surface of the bow, a controlling handle operating in a horizontal plane and secured to the bracket member, and a flexible member having connection with the outwardly extended arm and the handle to move the frame when the handle is moved in one direction, and spring members for normally urging the frame downwardly.

In testimony that I claim the foregoing as my own, I have hereto affixed my signature.

ARTHUR W. KLASSEN.